United States Patent Office 3,208,966
Patented Sept. 28, 1965

3,208,966
SULFUR-CONTAINING ORGANOSILICON ESTERS AS POLYOLEFIN STABILIZERS
Kenneth R. Molt, Ingenuin Hechenbleikner, and Otto A. Homberg, Cincinnati, Ohio, assignors to Carlisle Chemical Works, Inc., Reading, Ohio, a corporation of Ohio
No Drawing. Filed Sept. 22, 1961, Ser. No. 139,877
30 Claims. (Cl. 260—45.8)

The present invention relates to novel organosilicon compounds and to the stabilization of solid polymers of monoolefins having 2 to 4 carbon atoms and more particularly to the stabilization of polypropylene.

It is an object of the present invention to prepare novel organosilicon esters.

Another object is to prepare novel stabilized compositions containing solid polymers of monoolefins having 2 to 4 carbon atoms, preferably polypropylene.

A further object is to stabilize polypropylene and other polymers of moonolefins having 2 to 4 carbon atoms with synergistic stabilizer compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing certain organosilicon esters of sulfur containing carboxylic acids or esters thereof and by stabilizing polymers of monoolefins, preferably polypropylene, with these and other organosilicon esters of sulfur containing carboxylic acids and esters thereof.

The novel compounds include alkyl, aryl and haloaryl silicon esters of thiodialkane carboxylic acids such as thiodipropionic acid, thiodiacetic acid, and thiodibutyric acid as well as the half esters of these acids with alcohols, and phenols and the aryl and haloaryl silicon esters of compounds having the formula HSRCOOR' where R is an alkylene group and R' is hydrogen or hydrocarbon or haloaryl. Examples of such compounds include dibutylsilicon thiodipropionate, dioctylsilicon thiodipropionate, didecylsilicon thiodipropionate, diphenylsilicon thiodipropionate, bis(trisdecylsilicon) thiodipropionate, dimethylsilicon thiodipropionate, phenyl butylsilicon thiodipropionate, dipropylsilicon thiodipropionate, diamylsilicon thiodipropionate, di-sec. butylsilicon thiodipropionate, butyl octylsilicon thiodipropionate, di-p-tolylsilicon thiodipropionate, di-p-chlorophenylsilicon thiodipropionate, di-o-bromophenylsilicon thiodipropionate, dibutylsilicon thiodiacetate, dihexylsilicon thiodiacetate, diphenylsilicon thiodacetate, di-p-octylphenylsilicon thiodipropionate, dibutylsilicon thiodibutyrate, diethylsilicon thiodiacetate, bis(tributylsilicon) thiodipropionate, bis(tributylsilicon) thiodiacetate, bis(tributylsilicon) thiodibutyrate, bis(triphenylsilicon) thiodipropionate, 2,2-diphenyl-1-oxa-3-thia-2-sila-5-oxo-cyclopentane, triphenylsilicon mercaptoacetate, 2,2-di-p-tolyl-1-oxa-3-thia-2-sila-5-oxo-cyclopentane, 2,2-diphenyl-1-oxa-3-thia-2-sila-6-oxo-cyclohexane, dibutylsilicon di(mono lauryl thiodipropionate), dibutylsilicon di(monophenyl thiodipropionate), dibutylsilicon di(monostearyl thiodipropionate), dibutylsilicon di(monomethyl thiodipropionate), dibutylsilicon di(monolauryl thiodiacetate), dibutylsilicon di(monolauryl thiodibutyrate), dioctylsilicon di(monolauryl thiodipropionate), diphenylsilicon di(monolauryl thiodipropionate), dibutylsilicon di(mono-p-tolyl thiodipropionate), butylsilicon tris(monolauryl thiodipropionate), tributylsilicon monolauryl thiodipropionate, dicyclohexylsilicon thiodipropionate, dioctadecylsilicon thiodipropionate.

In addition to the novel compounds set forth supra there can also be used as stabilizers for the monoolefin polymers alkyl silicon esters of compounds having the formula HSRCOOR' where R is an alkylene group and R' is hydrogen, hydrocarbon or haloaryl. Examples of such compounds include 2,2-dibutyl-1-oxa-3-thia-2-sila-6-oxo-cyclohexane, 2,2 - dibutyl-1-oxa-3-thia-2-sila-5-oxo-cyclopentane, dibutyl bis(2-carbobutoxyethylthio) silane, dibutyl bis(2-carbooctadecoxyethylthio) silane, tributylsilicon mono-mercaptoacetate, tributylsilicon mono-mercaptopropionate, butylsilicon tri-mercaptopropionate, butylsilicon tri-mercaptoacetate, butylsilicon tri-mercaptobutyrate, 2,2 - dimethyl - 1-oxa-3-thia-2-sila-5-oxo-cyclopentane, 2,2 - dimethyl-1-oxa-3-thia-2-sila-6-oxo-cyclohexane, methylsilicon tri-mercaptoacetate, methylsilicon tri-mercaptopropionate, trimethylsilicon mercaptoacetate, trimethylsilicon mercaptopropionate, dibutyl bis(carboethoxymethylthio) silane, dibutyl bis(carbophenoxymethylthio) silane, 2,2 - dioctyl - 1-oxa-3-thia-2-sila-5-oxo-cyclopentane, dibutyl bis(carbochlorophenoxymethylthio (silane, 2,2-dioctyl-1-oxa-3-thia-2-sila-6-oxo-cyclohexane, 2,2-dicyclohexyl-1-oxa-3-thia-2-sila-5-oxo-cyclopentane.

The organosilicon compounds can be prepared by reacting a compound having the formula $R_nSiCl_{(4-n)}$ with a compound having either the formula $R_1OOC(CH_2)_xS(CH_2)_xCOOR_2$ or the formula $HS(CH_2)_xCOOR_3$. In the formulae above R is alkyl, aryl or haloaryl, $R_1$ is hydrogen or an alkali metal, $R_2$ and $R_3$ are hydrogen, an alkali metal, alkyl, aryl or haloaryl, $n$ is a positive integer lower than 4 and $x$ is an integer, preferably between 1 and 3. In the reaction the organo groups attached to the silicon are not removed but the chlorine is removed as sodium chloride, or hydrogen chloride, for example. The methods for carrying out the reaction can be those conventionally employed for reacting an organosilicon halide with a carboxylic acid or salt thereof or with a thiol. Typical of such reaction procedures which can be employed are those used in Charle Patent 2,944,942, Barry Patent 2,405,988, MacKenzie Patent, 2,537,073, and Orkin Patent 2,592,175.

While the stabilizers of the present invention can be used with polyethylene, polypropylene, ethylene-propylene copolymers (e.g. a 50–50 copolymer), polybutylene and polyisobutylene, they are preferably employed with polymers and copolymers of propylene. The problems of stabilizing polypropylene are more complex than are those of stabilizing polyethylene. Polypropylene contains a tertiary carbon atom which is easily oxidized. This is missing from polyethylene. The problems of stabilizing the monoolefin polymers are completely different from those of stabilizing poly vinyl chloride. The monoolefin polymer stabilizers of the present invention are ineffective as polyvinyl chloride stabilizers.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Ziegler type polymerization catalysts, e.g., trialkyl aluminum (tributyl aluminum) with titanium tetrachloride or dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

The organosilicon esters can be used as stabilizers in an amount of 0.01–10% by weight of the monoolefin polymer. Preferably 0.1–5% of the stabilizer is employed. When the organosilicon esters are employed together with other stabilizers usually 0.01–10% and preferably 0.1–5% of total stabilizer based on the weight of the polymer is employed.

As previously set forth the organosilicon compounds can be employed alone. However, synergistic action has been observed when the organosilicon esters are employed together with certain other stabilizers. Particularly good results are obtained when there is employed in addition to the organosilicon ester a neutral sulfur compound having a thio linkage beta to a carbon atom having both a hydrogen atom and a carboxyl group attached thereto. Such compounds are used in an amount of 0.01–10% by weight, preferably 0.1–5%. The preferred thio compound is dilauryl thiodipropionate. Other thio compounds include distearyl-3,3′-thiodipropionate (dioctadecyl-thiodipropionate), dicyclohexyl-3,3′ - thiodipropionate, dicetyl-3,3′-thiodipropionate, dihexyl-3,3′-thiodipropionate, dioctyl-3,3′-thiodipropionate, dibenzyl-3,3′-thiodipropionate, lauryl myristyl-3,3′-thiodipropionate, diphenyl - 3,3′ - thiodipropionate, di-p-methoxyphenyl-3,3′-thiodipropionate, didecyl-3,3′-thiodipropionate, dibenzyl-3,3′-thiodipropionate, diethyl-3,3′-thiodipropionate, lauryl ester of 3-methylmercapto propionic acid, lauryl ester of 3-butylmercapto propionic acid, lauryl ester of 3-laurylmercaptopropionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy)phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiasebacate, dilauryl-4,7,8,11-tetrathiatetradecandioate, dimyristyl-4,11-dithiatetradecandioate, lauryl - 3 - benzothiazylmercaptopropionate, as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids include stearyl (1,2-dicarboethoxyethylthio) acetate, stearyl (1,2-dicarbolauryloxethylthio) acetate, lauryl (1,2-dicarboethoxyethylthio) acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilauryl-maleate, phenylthiodioctyl maleate, cetyl (1,2-dicarboethoxythylthio) propionate and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition product of lauryl mercaptan with dibutyl itaconate, the addition product of the stearyl ester of mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of the polypropylene and other polymers of a monoolefin is adversely affected by impurities including residual catalyst. When thermal stability is important in addition to oxidative stability it has been found valuable to include alkaline earth metal salts of fatty acids in an amount of 0.01–10% by weight, preferably 0.1–5%, in the organosilicon ester formulations. Examples of such salts are calcium stearate, calcium, 2-ethylhexoate, calcium octoate, calcium oleate, calcium ricinoleate, calcium myristate, calcium palmitate, calcium laurate, barium laurate, barium stearate and magnesium stearate. Other fatty acid salts such as cadmium 2-ethylhexoate, zinc stearate, and cadmium stearate can also be employed.

Particularly effective synergistic stabilizing compositions have been obtained by utilizing a mixture of (1) the organosilicon ester, (2) the thio compound, particularly dilauryl thiodipropionate, and (3) the alkaline earth metal salt of a fatty acid.

The addition of phenolic antioxidants in an amount of 0.01–10% by weight, preferably 0.1–5% also has proved effective. Examples of such phenols include 2,6-di-t-butyl-p-cresol, butylated hydroxyanisole, propyl gallate, 4,4′-thiobis(6-tertiary-butyl-m - cresol), 4,4′ - cyclohexylidene diphenol, 2,5-di-tertiaryamyl hydroquinone, 4,4′-butylidene bis(6-tertiary-butyl-m-cresol), hydroquinone monobenzyl ether, 2,2′-methylene-bis(4-methyl-6-t-butylphenol), as well as the other phenols set forth in Salyer Patent 2,985,617. Other suitable phenols include 2-tertiary-butyl-4-decyloxyphenol, 2-tertiary - butyl - 4 - dodecyloxyphenol, 2-tertiary-butyl - 4 - octadecycloxyphenol, 4,4′-methylene-bis-(2,6-ditertiary butyl phenol), p-aminophenol, N-lauryl-p-aminophenol, 4,4′-thiobis(3-methyl-6-t-butylphenol), bis[o-(1,1,3,3 - tetramethylbutyl)phenol] sulfide, 4-acetyl-β-resorcylic acid, A-stage p-tertiary butylphenol-formaldehyde resin, 4 - dodecyloxy - 2 - hydroxybenzophenone, 3 - hydroxy-4-(phenyl-carbonyl) phenyl palmitate, n-dodecyl ester of 3-hydroxy-4-(phenylcarbonyl) phenoxyacetic acid and t-butylphenol.

The use of epoxy compounds in an amount of 0.01–10% by weight, preferably 0.1–5% in the organosilicon ester formulations has also been found valuable. Examples of such epoxy compounds include epoxidized soya oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins, phenoxypropylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy) acetyl phenone, mesityl oxide epoxide, 2-ethyl-3-propyl glycidamide, glycidyl ethers of glycerine, pentaerythritol and sorbitol, and 3,4-epoxycyclo - hexane - 1,1 - dimethanol bis(9,10-epoxystearate).

Likewise it has been found desirable to include neutral esters of citric acid, particularly acetyl tributyl citrate and tributyl citrate in an amount of 0.01–10% by weight, preferably 0.1–5%, in the organosilicon ester formulations. Examples of such citrates include neutral citrates having the formula

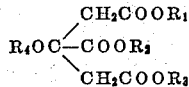

where $R_1$, $R_2$ and $R_3$ are selected from the group consisting of hydrocarbon, e.g., alkyl, aryl and cycloalkyl, and haloaryl and $R_4$ is selected from the group consisting of hydrogen, hydrocarbon, e.g., alkyl, aryl and cycloalkyl, or acyl groups. Preferably, the acyl group has 2 to 4 carbon atoms. Typical examples of such citrates are triethyl citrate, trimethyl citrate, tripropyl citrate, triisopropyl citrate, tributyl citrate, propyldibutyl citrate, tritertiary butyl citrate, triamyl citrate, trihexyl citrate, trioctyl citrate, tridecyl citrate, trioctadecyl citrate, tricyclohexyl citrate, triphenyl citrate, tribenzyl citrate, tri-p-tolyl citrate, tri-p-chlorophenyl citrate, acetyl trimethyl citrate, acetyl triethyl citrate, acetyl tripropyl citrate, acetyl tributyl citrate, acetyl propyldibutyl citrate, acetyl triamyl citrate, acetyl trioctyl citrate, acetyl trioctadecyl citrate, propionyl tributyl citrate, butyryl tributyl citrate, butyl tributyl citrate, phenyl tributyl citrate, chlorophenyl tributyl citrate, and acetyl triphenyl citrate.

The use of the citrates as stabilizers for polymers of monoolefins, particularly polypropylene, is claimed in co-pending application Serial No. 135,804, filed September 5, 1961.

Likewise there can be used dihydrocarbon tin salts of thiodipropionic acid in an amount of 0.01–10%, preferably 0.1–5%, with the organosilicon esters in stabilizing the polypropylene and other monoolefin polymers. Examples of such tin compounds include dibutyltin thiodipropionate, dioctyltin thiodipropionate, diphenyltin thiodipropionate, dilauryltin thiodipropionate and dineopentyltin thiodipropionate. These compounds can be made by reacting dihydrocarbontin oxide with thiodipropionic acid. Other tin compounds which can be used in like amounts include dihydrocarbontin esters of carboxy mercaptals such as dibutyltin propane-2,2-bis(mercaptopropionate),
dibutyltin benzaldi(mercaptoacetate),
dibutyltin benzaldi(mercaptopropionate),
dineopentyltin propane-2,2-bis(mercaptopropionate),
dibutyltin cyclohexyl-1,1-bis(mercaptopropionate),
dimethyltin propane-1,2-bis(omega mercaptooctanoate),
dioctadecyltin methane bis(mercaptoacetate),
diphenyltin propane-2,2-bis(mercaptopropionate),
dibutyltin propene-3,3-bis(mercaptopropionate),
butyl lauryltin phenylacetaldi(mercaptoacetate),
dihexyltin 2-butene-1,1-bis(mercaptopropionate),
dibutyltin diphenylmethane bis(mercaptopropionate),
dibenzyltin propane-2-mercaptoacetate-2-mercaptopropionate,
dibutyltin 2-hydroxy-4-methoxybenzaldi(mercaptobutyrate and
dibutyltin propane-2,2-bis(mercaptosuccinate).

The tin salts of the carboxy mercaptals can be prepared as set forth in Hechenbleikner et al. application 103,256, filed April 17, 1961, now U.S. Patent No. 3,078,290. The use of the various tin compounds as stabilizers for mono-olefin polymers, preferably polypropylene, is claimed in application Serial No. 139,876, filed September 22, 1961.

Additionally, there can be employed pseudothiohydantoins in an amount of 0.01–10% by weight, preferably 0.1–5%, with the organosilicon esters in stabilizing the monoolefin polymers, e.g., polypropylenes. Examples of such pseudohydantoins include pseudothiohydantoin,
5-cetyl pseudothiohydantoin,
$N^2$-nonylpseudothiohydantoin,
3-$N^2$-o-phenylenepseudothiohydantoin,
3-$N^2$-ethylenepseudothiohydantoin,
3-$N^2$-dioctylpseudothiohydantoin,
5,5-dimethylpseudothiohydantoin,
5-phenylpseudothiohydantoin,
5-p-tolylpseudothiohydantoin,
5-p-chlorophenylpseudothiohydantoin and
3-$N^2$-diphenylpseudothiohydantoin.

The use of pseudothiohydantoins as stabilizers for monoolefin polymers is claimed in application Serial No. 138,002, filed September 14, 1961.

Unless otherwise indicated all parts and percentages are by weight. The parts of stabilizer in the examples are per 100 parts of polymers.

The stability tests were carried out at 133° C. The polypropylenes employed were a Hercules Profax resin having a melt index of 0.4 and Hercules Profax resin 6501 which had a melt index of 0.8. The polypropylene of melt index 0.4 took less than 24 hours to degrade under the conditions of the stability test and the polypropylene melt index 0.8 took 48 hours to degrade under these conditions.

In preparing the polypropylene samples for the tests the samples were blended in methylene chloride with the indicated stabilizing substances. The solvent was evaporated and the polymer dried in an oven at 60° C. for four hours and then pressed into a 20 mil panel. Samples of the panel measuring 3 inches by ½ inch were suspended in a forced draft oven at 133° C. and the time required to bring about degradation of the polymer noted.

Typical examples of the preparation of the organosilicon esters are set forth below.

Example 1

A mixture of 0.1 mole of disodium thiodipropionate and 0.1 mole of dibutylsilicon dichloride in 100 grams of methyl ethyl ketone was heated under reflux for 2 hours, the solution cooled and filtered to remove the sodium chloride. The solvent was removed under vacuum to yield dibutylsilicon thiodipropionate as a white semi-solid residue, percent S 9.54 (theory 10.02).

Example 2

A mixture of 0.1 mole of mercaptopropionic acid and 0.2 mole of sodium hydroxide in 100 grams of toluene was heated under reflux until 0.2 mole of water had azeotroped off. The resulting suspension was treated with 0.1 mole of dibutylsilicon dichloride and refluxing was continued for 2 additional hours. After cooling the mixture and removing the sodium chloride by filtration, the solvent was removed under reduced pressure to yield 2,2-dibutyl-1-oxa-3-thia-2-sila-6-oxocyclohexane as a yellow oil, percent S 11.95 (theory 12.95).

Example 3

The procedure employed in Example 1 was followed replacing the dibutylsilicon dichloride by 0.1 mole of di-octylsilicon dichloride. The product recovered was dioctylsilicon thiodipropionate, a white waxy solid, percent S 6.6 (theory 7.4).

Example 4

The procedure of Example 1 was repeated replacing the dibutylsilicon dichloride by 0.1 mole of didecylsilicon dichloride. The product recovered was didecylsilicon thiodipropionate, a viscous yellow oil, percent S 6.04 (theory 6.57).

Example 5

The procedure of Example 1 was employed utilizing 0.072 mole of disodium thiodipropionate and replacing the dibutylsilicon dichloride by 0.072 mole of diphenylsilicon dichloride. The product recovered was diphenylsilicon thiodipropionate, a pale yellow waxy solid, percent S 8.3 (theory 8.9).

Example 6

The procedure of Example 1 was employed utilizing 0.03 mole of tris decylsilicon chloride and 0.015 mole of disodium thiodipropionate in 50 grams of methyl ethyl ketone. The bis(tris-decylsilicon) thiodipropionate recovered was a pale amber liquid.

Example 7

The procedure employed in Example 1 was followed utilizing 0.1 mole butylsilicon trichloride and 0.3 mole of monolauryl thiodipropionate to produce butylsilicon tris(monolauryl thiodipropionate).

Example 8

The procedure employed in Example 1 was followed utilizing 0.1 mole of dibutylsilicon dichloride and 0.2 mole of monolauryl thiodipropionate to produce dibutylsilicon bis(monolauryl thiodipropionate).

The stabilization results at 133° C. are shown in the following examples. The polymer in Example 14 was Alathon 14, a low density, high pressure polyethylene (molecular weight about 20,000, density about 0.916). The polymer in the other examples was polypropylene having the indicated melt index.

Example 9

The stabilizer was 0.5% of 2,2-dibutyl-1-oxa-3-thia-2-sila-6-oxo-cyclohexane and the polypropylene had a melt index of 0.4. It took 48 hours for the polypropylene to degrade, an improvement of over 24 hours over the unstabilized polypropylene.

Example 10

The stabilizer was 0.5% of diphenylsilicon thiodipropionate and the polypropylene had a melt index of 0.8. It took 72 hours for the polypropylene to degrade, an improvement of 24 hours over the unstabilized polypropylene.

Example 11

The stabilizer was a mixture of 0.166% of dilaurylthiodipropionate and 0.166% calcium stearate. It took 72 hours for polypropylene of melt index 0.4 to degrade. This was a comparison example so that the effect on stability of polypropylene of the organosilicon compounds could be noted when employing other additives.

Example 12

| | Percent |
|---|---|
| 2,2-dibutyl-1-oxa-3-thia-2-sila-6-oxo-cyclohexane | 0.166 |
| Dilaurylthiodipropionate | 0.166 |
| Calcium stearate | 0.166 |

The polypropylene of melt index 0.4 was stable for 96 hours.

Example 13

| | Percent |
|---|---|
| Dibutylsilicon thiodipropionate | 0.166 |
| Dilaurylthiodipropionate | 0.166 |
| Calcium stearate | 0.166 |

The polypropylene of melt index index 0.4 was stable for 312 hours.

Example 14

The procedure of Example 13 was repeated but the polypropylene was replaced by polyethylene to give a stabilized polyethylene.

Example 15

| | Percent |
|---|---|
| Dibutylsilicon thiodipropionate | 0.1 |
| Dilaurylthiodipropionate | 0.3 |
| 2,6-di-t-butyl-p-cresol | 0.1 |

The polypropylene of melt index 0.4 had improved stability.

Example 16

| | Percent |
|---|---|
| Dibutylsilicon thiodipropionate | 0.25 |
| 2,6-di-t-butyl-p-cresol | 0.25 |

The polypropylene of melt index 0.4 had improved stability.

Example 17

| | Percent |
|---|---|
| Dibutylsilicon thiodipropionate | 0.125 |
| Dilaurylthiodipropionate | 0.125 |
| Epoxidized soybean oil | 0.125 |
| Calcium stearate | 0.125 |

The polypropylene of melt index 0.4 had improved stability.

Example 18

| | Percent |
|---|---|
| Diphenylsilicon thiodipropionate | 0.166 |
| Dilaurylthiodipropionate | 0.166 |
| Calcium stearate | 0.166 |

The polypropylene of melt index 0.4 was stable for 288 hours.

Example 19

| | Percent |
|---|---|
| Didecylsilicon thiodipropionate | 0.166 |
| Dilaurylthiodipropionate | 0.166 |
| Calcium stearate | 0.166 |

The polypropylene of melt index 0.8 was stable for 144 hours.

Example 20

| | Percent |
|---|---|
| Dioctylsilicon thiodipropionate | 0.166 |
| Dilaurylthiodipropionate | 0.166 |
| Calcium stearate | 0.166 |

The polypropylene of melt index 0.8 was stable for 120 hours.

Example 21

| | Percent |
|---|---|
| Bis(tris-decylsilicon) thiodipropionate | 0.166 |
| Dilaurylthiodipropionate | 0.166 |
| Calcium stearate | 0.166 |

The polypropylene of melt index 0.8 was stable for 96 hours.

Example 22

| | Percent |
|---|---|
| Dibutylsilicion thiodiacetate | 0.166 |
| Dilaurylthiodipropionate | 0.166 |
| Calcium stearate | 0.166 |

A stable polypropylene of melt index 0.4 is produced.

Example 23

| | Percent |
|---|---|
| Dimethylsilicon thiodibutyrate | 0.166 |
| Dilaurylthiodipropionate | 0.166 |
| Calcium stearate | 0.166 |

A stable polypropylene of melt index 0.8 is produced.

Example 24

| | Percent |
|---|---|
| Dibutylsilicon thiodiacetate | 0.125 |
| Dilaurylthiodipropionate | 0.125 |
| 2,6-di-t-butyl-p-cresol | 0.125 |
| Calcium stearate | 0.125 |

A stable polypropylene of melt index 0.4 is produced.

Example 25

| | Percent |
|---|---|
| Dibutylsilicon thiodibutyrate | 0.166 |
| Dilaurylthiodipropionate | 0.166 |
| Calcium stearate | 0.166 |

A stable polypropylene of melt index 0.8 is produced.

Example 26

| | Percent |
|---|---|
| 2,2-diphenyl-1-oxa-3-thia-2-sila-5-oxo-cyclopentane | 0.125 |
| Dilaurylthiodipropionate | 0.125 |
| 2,6-di-t-butyl-p-cresol | 0.125 |
| Calcium stearate | 0.125 |

A stable polypropylene of melt index 0.8 is produced.

Example 27

| | Percent |
|---|---|
| Dibutylsilicon di(monolauryl) thioproprionate | 0.166 |
| Dilaurylthiodipropionate | 0.166 |
| Calcium stearate | 0.166 |

A stable polypropylene of melt index 0.4 is produced.

Example 28

| | Percent |
|---|---|
| Dibutylsilicon di(monolauryl) thioproprionate | 0.125 |
| Dilaurylthiodipropionate | 0.125 |
| 2,6-di-t-butyl-p-cresol | 0.125 |
| Calcium stearate | 0.125 |

A stable polypropylene of melt index 0.4 is produced.

Example 29

| | Percent |
|---|---|
| Dibutyl bis(2-carbobutoxyethylthio) silane | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

Example 30

| | Percent |
|---|---|
| Tributylsilicon monomercaptoproprionate | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

Example 31

| | Percent |
|---|---|
| Butylsilicon thimercaptoacetate | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

The stabilizer compositions can be packaged and sold as such and can be blended into the polymer of the monoolefin by the processor or user of the polymer. Alternatively, the polymer manufacturer can blend the stabilizer into the polymer and sell the stabilized polymer to the processor or ultimate user.

What is claimed is:

1. A member of the group consisting of 1–18 carbon atom alkyl, cyclohexyl, phenyl, tolyl and halophenyl silicon esters of a compound selected from the group consisting of thiodialkane carboxylic acids and half esters of such acids, each alkane unit of the thiodialkane carboxylic acids containing 2–4 carbon atoms, with a member of the group consisting of alkanols having 1–18 carbon atoms and monohydric phenols.

2. An organosilicon ester of a thiodialkane carboxylic acid having 2–4 carbon atoms in each alkane group and wherein the organo is selected from the group consisting of 1–18 carbon atom alkyl, cyclohexyl, phenyl, tolyl and halophenyl.

3. A monoorganosilicon ester of a thiodialkane carboxylic acid having 2 to 4 carbon atoms in each alkane group wherein the organo is selected from the group consisting of 1–18 carbon atom alkyl, cyclohexyl, phenyl, tolyl and halophenyl.

4. A diorganosilicon ester of a thiodialkane carboxylic acid having 2 to 4 carbon atoms in each alkane group wherein the organo is selected from the group consisting of 1–18 carbon atom alkyl, cyclohexyl, phenyl, tolyl and halophenyl.

5. A triorganosilicon ester of a thiodialkane carboxylic acid having 2 to 4 carbon atoms in each alkane group wherein the organo is selected from the group consisting of 1–18 carbon atom alkyl, cyclohexyl, phenyl, tolyl and halophenyl.

6. A dialkylsilicon thiodipropionate wherein the alkyl groups have 1–18 carbon atoms.

7. Dibutylsilicon thiodipropionate.

8. Diphenylsilicon thiodipropionate.

9. A polymer of a monoolefin having 2 to 4 carbon atoms stabilized with 0.01 to 10% by weight of a member of the group consisting of 1–18 carbon atom alkyl, cyclohexyl, phenyl, tolyl and halophenyl silicon esters of a compound selected from the group consisting of thiodialkane carboxylic acids and half esters of such acids, each alkane unit of the thiodialkane carboxylic acids containing 2–4 carbon atoms, with a member of the group consisting of alkanols having 1–18 carbon atoms and monohydric phenols.

10. A stabilized composition according to claim 9 wherein the polymer is polypropylene.

11. A stabilized polymer according to claim 9 including a neutral sulfur compound having a thio linkage beta to a carbon atom having both a hydrogen atom and a carboxyl group attached thereto wherein said neutral sulfur compound has the formula $ROOCCH_2CH_2SX$ where R is selected from the group consisting of alkyl, cyclohexyl, phenyl, benzyl, and X is selected from the group consisting of alkyl, phenyl, benzyl, cyclohexyl, $$CH_2CH_2COOR$$

hydroxymethyl, hydroxyethyl, carboxymethyl and carboxypropyl.

12. A stabilized polymer according to claim 11 wherein the sulfur compound is dilaurylthiodipropionate.

13. Polypropylene stabilized with 0.01 to 10% by weight of a member of the group consisting of 1–18 carbon atom alkyl, cyclohexyl, phenyl, tolyl and halophenyl silicon esters of a thiodialkane carboxylic acid having 2 to 4 carbon atoms in each alkane group.

14. Polypropylene stabilized with 0.01 to 10% by weight of a member of the group consisting of 1–18 carbon atom alkyl, cyclohexyl, phenyl, tolyl and halophenyl silicon esters of thiodipropionic acid.

15. Polypropylene stabilized with 0.01 to 10% by weight of a diorganosilicon ester of thiodipropionic acid and wherein the organo groups are selected from the group consisting of 1–18 carbon atom alkyl, cyclohexyl, phenyl, tolyl and halophenyl.

16. Polypropylene stabilized with 0.01 to 10% by weight of dibutylsilicon thiodipropionate.

17. Polypropylene stabilized with 0.01 to 10% by weight of diphenylsilicon thiodipropionate.

18. A stabilized polymer according to claim 13 including a neutral sulfur compound having a thio linkage beta to a carbon atom having both a hydrogen atom and a carboxyl group attached thereto wherein said neutral sulfur compound has the formula $ROOCCH_2CH_2SX$ where R is selected from the group consisting of alkyl, cyclohexyl, phenyl, benzyl, and X is selected from the group consisting of alkyl, phenyl, benzyl, cyclohexyl, $$CH_2CH_2COOR$$

hydroxymethyl, hydroxyethyl, carboxymethyl and carboxypropyl.

19. A stabilized polymer according to claim 13 including dilaurylthiodipropionate.

20. A stabilized polymer according to claim 16 including dilaurylthiodipropionate.

21. A stabilized polymer according to claim 17 including dilaurylthiodipropionate.

22. A mixture of a member of the group consisting of alkyl, cyclohexyl, phenyl, alkyl phenyl and halophenyl silicon esters of a compound selected from the group consisting of thiodialkane carboxylic acids and half esters of such acids with a member of the group consisting of alkanols and monohydric phenols with a neutral sulfur compound having a thio linkage beta to a carbon atom having both a hydrogen atom and a carboxyl group attached thereto wherein said neutral sulfur compound has the formula $ROOCCH_2CH_2SX$ where R is selected from the group consisting of alkyl, cyclohexyl, phenyl, benzyl, and X is selected from the group consisting of alkyl, phenyl, benzyl, cyclohexyl, $CH_2CH_2COOR$, hydroxymethyl, hydroxyethyl, carboxymethyl and carboxypropyl.

23. The organic product of reaction between a member of the group consisting of phenyl, tolyl, and halophenyl silicon chlorides and a compound having the formula $HSR_1COOR_2$ wherein $R_1$ is an alkylene group having 1–3 carbon atoms and $R_2$ is member of the group consisting of hydrogen, alkyl having 1–18 carbon atoms, phenyl, tolyl and halophenyl.

24. A polymer of a monoolefin having 2 to 4 carbon atoms stabilized with 0.01 to 10% by weight of an organic product of reaction between a member of the group consisting of phenyl, tolyl, and halophenyl silicon chlorides and a compound having the formula

HSR₁COOR₂ wherein $R_1$ is an alkylene group having 1–3 carbon atoms and $R_2$ is a member of the group consisting of hydrogen, alkyl, having 1–18 carbon atoms, phenyl, tolyl and halophenyl.

25. A stabilized composition according to claim 24 wherein the polymer is polypropylene.

26. A stabilized polymer according to claim 25 including a neutral sulfur compound having a thio linkage beta to a carbon atom having both a hydrogen atom and a carboxyl group attached thereto wherein said neutral sulfur compound has the formula ROOCCH₂CH₂SX wherein R is selected from the group consisting of alkyl, cyclohexyl, phenyl, benzyl, and X is selected from the group consisting of alkyl, phenyl, benzyl, cyclohexyl, CH₂CH₂COOR, hydroxymethyl, hydroxyethyl, carboxymethyl and carboxypropyl.

27. A stabilized polymer according to claim 26 wherein the sulfur compound is dilauryl thiodipropionate.

28. A mixture of an organic product of reaction between a member of the group consisting of phenyl, tolyl, and halophenyl silicon chlorides and a compound having the formula HSR₁COOR₂ wherein $R_1$ is an alkylene group having 1–3 carbon atoms and $R_2$ is a member of the group consisting of hydrogen, alkyl having 1–18 carbon atoms, phenyl, tolyl and halophenyl with a neutral sulfur compound having a thio linkage beta to a carbon atom having both a hydrogen atom and a carboxyl group attached thereto wherein said neutral sulfur compound has the formula ROOCCH₂CH₂SX where R is selected from the group consisting of alkyl, cyclohexyl, phenyl, benzyl, and X is selected from the group consisting of alkyl, phenyl, benzyl, cyclohexyl, CH₂CH₂COOR, hydroxymethyl, hydroxyethyl, carboxymethyl and carboxypropyl.

29. Polypropylene stabilized with 0.01 to 10% by weight of an organic product of reaction between a member of the group consisting of 1–18 carbon atom alkyl, cyclohexyl, phenyl, tolyl and halophenyl silicon chlorides and a compound having the formula HSR₁COOR₂ wherein $R_1$ is an alkylene group having 1–3 carbon atoms and $R_2$ is a member of the group consisting of hydrogen, alkyl having 1–18 carbon atoms, phenyl, tolyl and halophenyl.

30. Stabilized polypropylene according to claim 29, including dilaurylthiodipropionate.

References Cited by the Examiner

UNITED STATES PATENTS 2,944,942    7/60    Charle et al. _____ 260—448.8

LEON J. BERCOVITZ, *Primary Examiner.*

ALPHONSO D. SULLIVAN, *Examiner.*